(12) United States Patent
Lee et al.

(10) Patent No.: US 9,497,662 B2
(45) Date of Patent: Nov. 15, 2016

(54) METHODS AND DEVICES FOR REDUCING SIGNALING OVERHEAD

(75) Inventors: Anthony Lee, San Diego, CA (US); Guotong Wang, Beijing (CN)

(73) Assignee: Intel Corporation, Santa Clara, CA (US)

(*) Notice: Subject to any disclaimer, the term of this patent is extended or adjusted under 35 U.S.C. 154(b) by 628 days.

(21) Appl. No.: 13/153,221

(22) Filed: Jun. 3, 2011

(65) Prior Publication Data

US 2011/0300889 A1 Dec. 8, 2011

Related U.S. Application Data

(60) Provisional application No. 61/351,089, filed on Jun. 3, 2010.

(51) Int. Cl.
| | |
|---|---|
| *H04W 4/00* | (2009.01) |
| *H04B 1/00* | (2006.01) |
| *H04B 7/00* | (2006.01) |
| *H04W 28/06* | (2009.01) |
| *H04W 80/00* | (2009.01) |
| *H04L 29/06* | (2006.01) |
| *H04W 80/02* | (2009.01) |

(52) U.S. Cl.
CPC ............ *H04W 28/06* (2013.01); *H04W 80/00* (2013.01); *H04L 29/06068* (2013.01); *H04L 29/06095* (2013.01); *H04W 80/02* (2013.01)

(58) Field of Classification Search
CPC ... H04W 28/06; H04W 80/00; H04W 80/02; H04L 29/06068; H04L 29/06095
See application file for complete search history.

(56) References Cited

U.S. PATENT DOCUMENTS

| | | | | |
|---|---|---|---|---|
| 2005/0094670 A1* | 5/2005 | Kim | .............................. | 370/477 |
| 2010/0128727 A1* | 5/2010 | Takechi | ................ | H04L 12/185 370/392 |
| 2011/0110316 A1* | 5/2011 | Chen | ..................... | H04L 5/0053 370/329 |
| 2011/0110327 A1* | 5/2011 | Ramachandran | ..... | H04W 8/205 370/331 |
| 2011/0149790 A1* | 6/2011 | Mabuchi | ................ | H04L 1/0034 370/252 |

FOREIGN PATENT DOCUMENTS

CN 1949769 4/2007

OTHER PUBLICATIONS

English language translation of abstract of CN 1949769 (published Apr. 18, 2007).

* cited by examiner

*Primary Examiner* — Lonnie Sweet
(74) *Attorney, Agent, or Firm* — Schiff Hardin LLP

(57) ABSTRACT

A method for reducing signaling overhead in user equipment (UE) connected to a base station is provided. The method includes: when the UE sends Radio Resource Control (RRC) layer messages to the base station, the UE compresses RRC layer messages and sends the compressed RRC layer messages to the base station; and when the UE receives the compressed RRC layer messages from the base station, the UE decompresses the compressed RRC layer messages received from the base station.

16 Claims, 4 Drawing Sheets

METHODS AND DEVICES FOR REDUCING SIGNALING OVERHEAD

CROSS REFERENCE TO RELATED APPLICATIONS

This Application claims priority of U.S. Provisional Application No. 61/351,089, filed on Jun. 3, 2010, and the entirety of which is incorporated by reference herein.

BACKGROUND OF THE INVENTION

1. Field of the Invention

The disclosure generally relates to a method and device for reducing signaling overhead, and more particularly relates to a method and device for reducing signaling overhead in machine type communications.

2. Description of the Related Art

For traditional mobile network services, Human-to-Human communications take a major place. For Human-to-Human communications, because both parties involved in the communications are people with the ability to control their behavior, the communications is actually controlled by the behavior of the people. With the development of mobile network services and automatic control technology, a new way of mobile communications have been developed, which is called machine type communications (MTC) (also referred to as "Machine-to-Machine" or "M2M"). Machine type communications may be seen as a form of data communication between entities that do not necessarily need human interaction.

Machine type communications may be used in a variety of areas such as: security, tracking/tracing, healthcare, remote maintenance/control and metering. Machine type communications may be used in surveillance systems, order management, gaming machines and remote monitoring of vital signs. Machine type communications may be used in programmable logic controllers (PLCs), sensors, lighting, and vending machine controls and in applications related to power, gas, water, heating, grid control, and industrial metering. Additionally, machine type communications based on Machine-to-Machine (M2M) technology may be used in areas such as customer service.

Depending on its implementation, machine type communications may be different from some current type of communication models. Most machine type communications focus on the transmission of small sizes of data. These applications for small data transmission are characterized by small amounts of transmitted data (e.g. 10~1000 bytes) during the whole time of the data connection. However, machine type communications devices need to send several control signaling messages to establish the connection between the user equipment (UE) and the base station before data transmission, e.g. msg3 of random access, RRCConectionRequest, RRCConectionSetup, RRCConectionSetupComplete, etc. Meanwhile, the exchange of Non Access Stratum (NAS) layer signaling messages may be configured to be set up between the UE and the network and be carried in Radio Resource Control (RRC) messages.

Generally speaking, when the amount of transmission transmitted by the machine type communications device is large, the amount of the control signaling messages is increased before data transmission. This degrades system throughput and lowers resource efficiency as the control signaling messages take a lot of resources for small size data transmission.

For this reason, methods and devices for reducing signaling overhead are provided for machine type communications applications which have the feature of small data transmission to reduce use of resources generated by signaling overhead and improve resource efficiency.

BRIEF SUMMARY OF THE INVENTION

Methods and devices for reducing signaling overhead are provided.

In one exemplary embodiment, the disclosure is directed to a method for reducing signaling overhead configured to a user equipment (UE) connected to a base station, wherein the method comprises: when the UE sends Radio Resource Control (RRC) layer messages to the base station, the UE compresses the RRC layer messages and sends the compressed RRC layer messages to the base station; and when the UE receives the compressed RRC layer messages from the base station, the UE decompresses the compressed RRC layer messages received from the base station.

In one exemplary embodiment, the disclosure is directed to a method for reducing signaling overhead configured to a base station connected to a user equipment (UE), wherein the method comprises: when the base station receives Radio Resource Control (RRC) layer messages from the UE, the base station decompresses the compressed RRC layer messages; and when the base station sends the RRC layer messages to the UE, the base station compresses the RRC layer messages and sends the compressed RRC layer messages to the UE.

In one exemplary embodiment, the disclosure is directed to a user equipment (UE) for reducing signaling overhead, wherein the UE is connected to a base station through a communication network, and the UE comprises: a Radio Resource Control (RRC) layer, a compression unit and a decompression unit. When the UE sends RRC layer messages to the base station, the compression unit compresses RRC layer messages and sends the compressed RRC layer messages to the base station. When the UE receives the compressed RRC layer messages from the base station, the decompression unit decompresses the compressed RRC layer messages received from the base station.

In one exemplary embodiment, the disclosure is directed to a base station for reducing signaling overhead, wherein the base station is connected to a user equipment (UE) through a communication network, and the base station comprises: a Radio Resource Control (RRC) layer, a compression unit and a decompression unit. When the base station sends RRC layer messages to the UE, the compression unit compresses RRC layer messages and sends the compressed RRC layer messages to the UE. When the base station receives the compressed RRC layer messages from the UE, the decompression unit decompresses the compressed RRC layer messages received from the UE.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
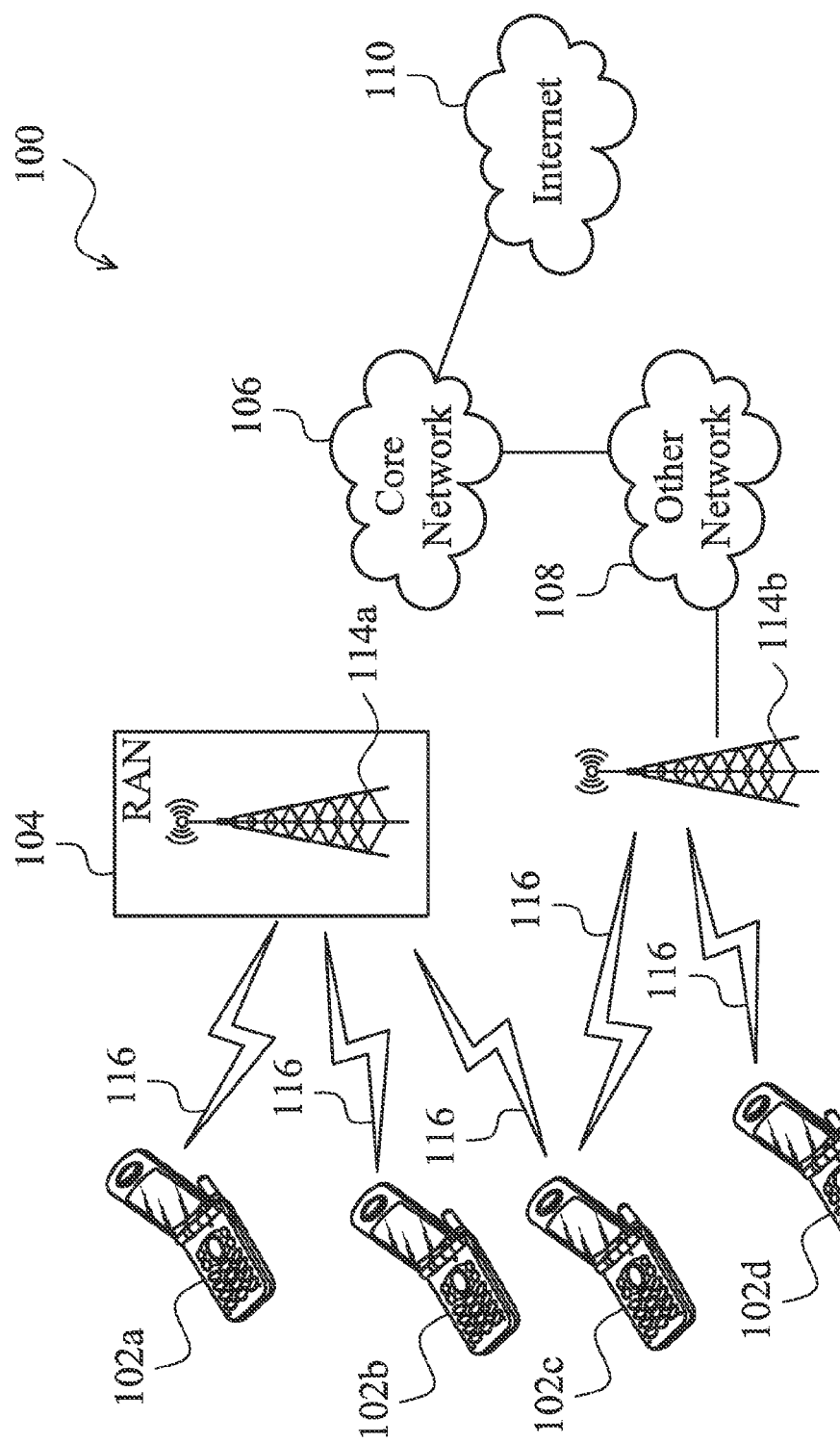
FIG. 1 is a diagram illustrating a machine type communications network architecture 100 according to an embodiment of the invention.

FIG. 1 is a diagram illustrating a machine type communications network architecture 100 according to an embodiment of the invention. The machine type communications network architecture 100 may be a multiple access system that provides Context, such as voice, data, video, messaging, broadcast, etc., to multiple wireless users. The machine type communications network architecture 100 may enable multiple wireless users to access such Context through the sharing of system resources, including wireless bandwidth. For example, the machine type communications network architecture 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the machine type communications network architecture 100 may include user equipments (UEs) 102a, 102b, 102c, and 102d, a radio access network (RAN) 104, a core network 106, the Internet 108, and other networks 110, though it will be appreciated that the disclosed embodiments contemplate using any number of the UEs, base stations, networks, and/or network elements. Each of the UEs 102a, 102b, 102c, and 102d may be any type of device configured to operate and/or communicate in a wireless environment. By way of example, the UEs 102a, 102b, 102c, and 102d may be configured to transmit and/or receive wireless signals and may include a mobile station, a fixed or mobile subscriber unit, a pager, a cellular telephone, a personal digital assistant (PDA), a smartphone, a laptop, a netbook, a personal computer, a wireless sensor, a media transfer protocol (MTC) device, a consumer electronic product, and the like.

The machine type communications network architecture 100 may also include a base station 114a and a base station 114b. Each of the base stations 114a, and 114b may be any type of device configured to wirelessly interface with at least one of the UEs 102a, 102b, 102c, and 102d to facilitate access to one or more communication networks, such as the core network 106, the Internet 108, and/or other networks 110. By way of example, the base stations 114a, and 114b may be a base transceiver station (BTS), a Node-B, an Evolved Node B (eNode B), a Home Node B, a Home eNode B, a site controller, an access point (AP), a wireless router, and the like. While the base stations 114a, and 114b are each depicted as a single element, it will be appreciated that the base stations 114a, and 114b may include any number of interconnected base stations and/or network elements.

The base station 114a may be part of the Radio Access Networks (RAN) 104, which may also include other base stations and/or network elements (not shown), such as a base station controller (BSC), a radio network controller (RNC), relay nodes, etc. The base stations 114a, and 114b may communicate with one or more of the UEs 102a, 102b, 102c, and 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT). More specifically, as noted above, the machine type communications network architecture 100 may be a multiple access system and may employ one or more channel access schemes, such as CDMA, TDMA, FDMA, OFDMA, and SC-FDMA, and the like. For example, the base station 114a in the RAN 104 and the UEs 102a, 102b, and 102c may implement a radio technology such as Universal Mobile Telecommunications System (UMTS) Terrestrial Radio Access (UTRA), which may establish the air interface 116 using wideband CDMA (WCDMA).

In another embodiment, the base station 114a and the UEs 102a, 102b, and 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the UEs 102a, 102b, and 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), and GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, and a campus, and the like. In one embodiment, the base station 114b and the UEs 102c, and 102d may implement a radio technology such as IEEE 802.11 to establish a wireless local area network (WLAN). In another embodiment, the base station 114b and the UEs 102c, and 102d may implement a radio technology such as IEEE 802.15 to establish a wireless personal area network (WPAN). In yet another embodiment, the base station 114b and the UEs 102c, and 102d may utilize a cellular-based RAT (e.g., WCDMA, CDMA2000, GSM, LTE, LTE-A, etc.) to establish a picocell or femtocell. As shown in FIG. 1, the base station 114b may be directly connected to the Internet 108. Thus, the base station 114b may not be required to access the Internet 108 via the core network 106.

The RAN 104 may be in communication with the core network 106, which may be any type of network configured to provide voice, data, applications, and/or voice over internet protocol (VoIP) services to one or more of the UEs 102a, 102b, 102c, and 102d. For example, the core network 106 may provide call control, billing services, mobile location-based services, pre-paid calling, Internet connectivity, and video distribution, etc., and/or perform high-level security functions, such as user authentication. Although not shown in FIG. 1, it will be appreciated that the RAN 104 and/or the core network 106 may be in direct or indirect communication with other RANs that employ the same RAT as the RAN 104 or a different RAT. For example, in addition to being connected to the RAN 104, which may be utilizing the E-UTRA radio technology, the core network 106 may also be in communication with another RAN (not shown) employing the GSM radio technology.

The core network 106 may also serve as a gateway for the UEs 102a, 102b, 102c, and 102d to access the Internet 108, and/or other networks 110. The Internet 108 may include a global system of interconnected computer networks and devices that use common communication protocols, such as the transmission control protocol (TCP), user datagram protocol (UDP) and the internet protocol (IP) in the TCP/IP internet protocol suite. The networks 110 may include wired or wireless communications networks owned and/or operated by other service providers. For example, the networks 110 may include another core network connected to one or more RANs, which may employ the same RAT as the RAN 104 or a different RAT.

Some or all of the UEs 102a, 102b, 102c, and 102d in the machine type communications network architecture 100 may include multi-mode capabilities, i.e., the UEs 102a, 102b, 102c, and 102d may include multiple transceivers for communicating with different wireless networks over different wireless links. For example, the UE 102c shown in FIG. 1 may be configured to communicate with the base station 114a, which may employ the cellular-based radio technology, and with the base station 114b, which may employ the IEEE 802 radio technology.

Figure 2:
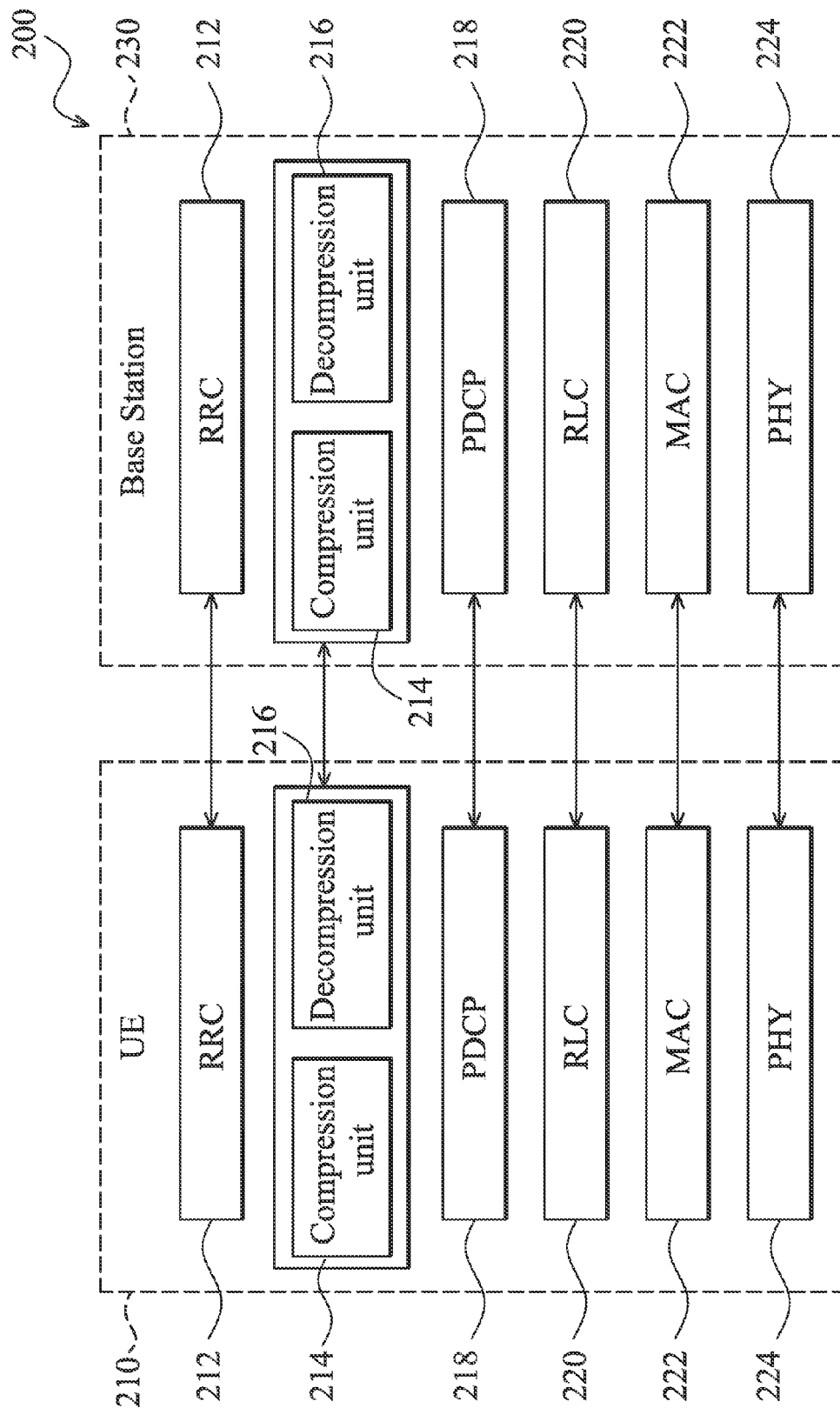
FIG. 2 is a diagram illustrating a control plane 200 protocol stack of the machine type communications system according to one exemplary embodiment.

Referring to FIG. 2, a control plane 200 protocol stack of the machine type communications system according to one exemplary embodiment. The control plane 200 performs a function of exchanging a control signal between a UE 210 and a base station 230. The control plane 200 includes a Radio Resource Control (RRC) layer 212, a Packet Data Convergence Protocol (PDCP) layer 218, a Radio Link Control (RLC) layer 220, a Medium Access Control (MAC) layer 222 and a physical (PHY) layer 224. A compression unit 214 and a decompression unit 216 between the RRC layer 212 and the PDCP layer 218 is further added in the control plane 200. Moreover, the control plane 200 additionally includes a Network Access Stratum (NAS) layer (not shown), which performs, among other things, Evolved Packet System (EPS) bearer management, authentication, and security control.

The PHY layer 224 provides information transmission services using the radio transmission technology and corresponds to a first layer of an open system interconnection (OSI) layer. The PHY layer 224 is connected to the MAC layer 222 through a transport channel. Data exchange between the MAC layer 222 and the PHY layer 224 is performed through the transport channel. The transport channel is defined by a scheme through which specific data are processed in the PHY layer 224.

The MAC layer 222 performs the function of sending data transmitted from a RLC layer 220 through a logical channel to the PHY layer 224 through a proper transport channel and further performs the function of sending data transmitted from the PHY layer 224 through a transport channel to the RLC layer 220 through a proper logical channel. Further, the MAC layer 222 inserts additional information into data received through the logical channel and analyzes the inserted additional information from data received through the transport channel to perform a proper operation and controls a random access operation.

The MAC layer 222 and the RLC layer 220 are connected to each other through a logical channel. The RLC layer 220 controls the setting and release of a logical channel and may operate in one of an acknowledged mode (AM) operation mode, an unacknowledged mode (UM) operation mode and a transparent mode (TM) operation mode. Generally, the RLC layer 220 divides the Service Data Unit (SDU) sent from an upper layer at a proper size and vice versa. Further, the RLC layer 220 takes charge of an error correction function through an automatic retransmission request (ARQ).

The PDCP layer 218 is disposed above the RLC layer 220 and performs a header compression function of data transmitted in an IP packet form and a function of transmitting data without loss even when a Radio Network Controller (RNC) providing a service changes due to the movement of the UE 210.

The RRC layer 212 controls logical channels, transport channels and physical channels in relation to establishment, re-configuration and release of Radio Bearers (RBs). Here, the RB signifies a service provided by the second layer of an OSI layer for data transmissions between the terminal and the E-UTRAN. If an RRC connection is established between the RRC layer 212 of the UE 210 and the RRC layer 212 of the base station 230, the UE 210 is in the RRC connected mode. Otherwise, the UE 210 is in an RRC idle mode.

When the RRC connection is established between the RRC layer 212 of the UE 210 and the RRC layer 212 of the base station 230, the machine type communications system employ the mechanism of signaling compression for the RRC layer 212 to reduce redundancy.

Figure 3:
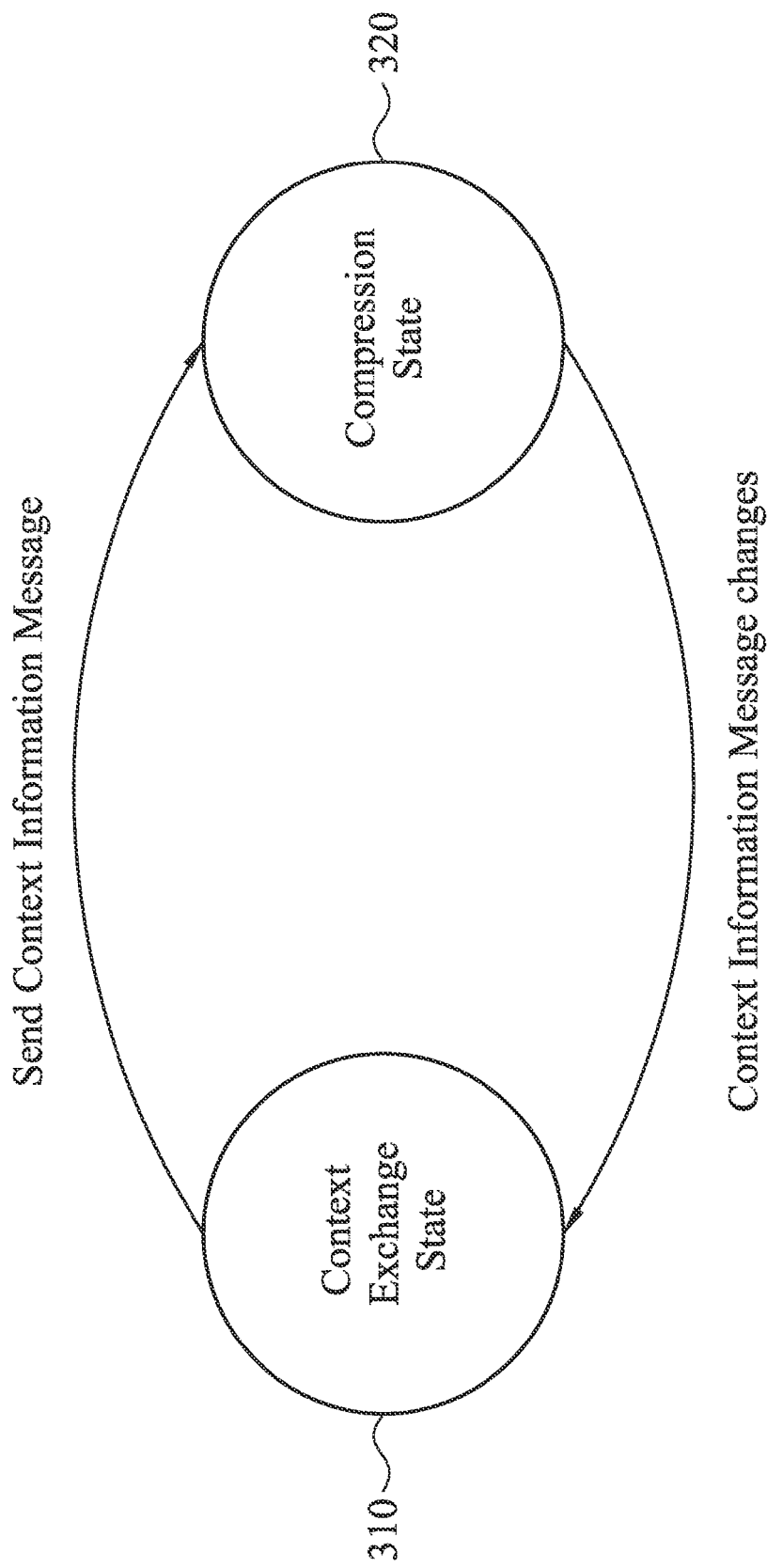
FIG. 3 is a diagram illustrating a compression method of the machine type communications system according to an embodiment of the invention.

FIG. 3 is a diagram illustrating a compression method of the machine type communications system according to an embodiment of the invention. Reference may be made to FIG. 2. When the UE 210 sends RRC layer messages to the base station 230, the compression unit 214 of the UE 210 compresses the RRC layer messages and sends the compressed RRC layer messages to the base station 230. The decompression unit 216 of the base station 230 decompresses the compressed RRC layer messages received from the UE 210. Before compressing the RRC layer messages, the compression unit 214 of the UE 210 works in the Context Exchange state 310 and then sends a Context Information Message used to decompress the compressed RRC layer messages to the decompression unit 216 of the base station 230. After sending the Context Information Message, the compression unit 214 of the UE 210 enters the Compression state 320 and compresses the RRC layer messages. If the Context Information Message needs to be modified/reset or the Context Information Message is changed, the compression unit 214 of the UE 210 stops compressing the RRC layer messages and transits into the Context Exchange state 310 from the Compression state 320 to resend an updated Context Information Message to the base station 230.

Similarly, when the base station 230 sends the RRC layer messages to the UE 210, the compression unit 214 of the base station 230 compresses the RRC layer messages and sends the messages to the UE 210. The decompression unit 216 of the UE 210 decompresses the compressed RRC layer messages received from the base station 230. Before compressing the RRC layer messages, the compression unit 214 of the base station 230 works in the Context Exchange state 310 and then sends a Context Information Message used to decompress the compressed RRC layer messages to the decompression unit 216 of the UE 210. After sending the Context Information Message, the compression unit 214 of the base station 230 enters a Compression state 320 and compresses the RRC layer messages. If the Context Information Message needs to be modified/reset or the Context Information Message is changed, the compression unit 214 of the base station 230 stops compressing the RRC layer messages and transits into the Context Exchange state 310 from the Compression state 320 to resend the updated Context Information Message to the UE.

In another embodiment, the Context Information Message additionally includes user identification information, logical channel identifier, and fixed physical layer resource information, etc.

In the process of compressing or decompressing the RRC layer messages by the UE, user identification messages of the Context Information Message may be provided to the base station when the UE sends a network access request. At the same time, in the process of confirming the connection, the base station resends the user identification messages to the UE for confirmation. The base station may also distribute logic channels and physical layer resource information according to the access request of the UE.

Figure 4:
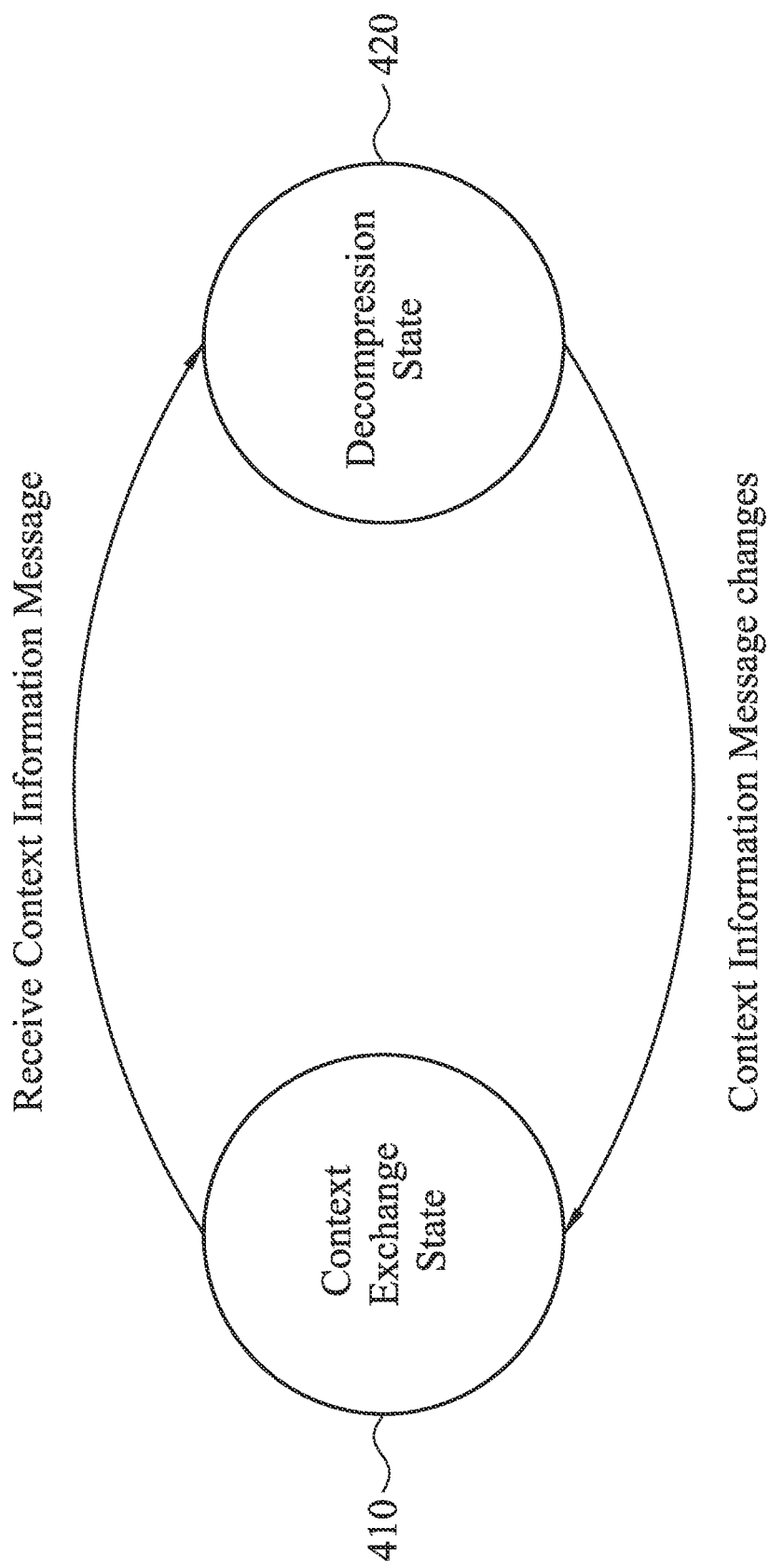
FIG. 4 is a diagram illustrating a decompression method of the machine type communications system according to an embodiment of the invention.

FIG. 4 is a diagram illustrating a decompression method of the machine type communications system according to an embodiment of the invention. Reference may be made to FIG. 2. Before decompressing the RRC layer messages, the decompression unit 216 of the base station 230 works in the Context Exchange state 410 and then receives the Context Information Message sent from the compression unit 214 of the UE 210 for decompressing the RRC layer messages. After receiving the Context Information Message, the decompression unit 216 of the base station 230 enters the Decompression state 420 and decompresses the RRC layer messages. If the Context Information Message needs to be modified/reset or the Context Information Message is changed, the decompression unit 216 of the base station 230 stops decompressing the RRC layer messages and transits into the Context Exchange state 410 from the Decompression state 420 to resend the updated Context Information Message.

Similarly, before decompressing the RRC layer messages, the decompression unit 216 of the UE 210 works in the Context Exchange state 410 and then receives Context Information Message sent from the compression unit 214 of the base station 210 for decompressing the RRC layer messages. After receiving the Context Information Message, the decompression unit 216 of the UE 210 enters Decompression state 420 and decompresses the RRC layer messages. If the Context Information Message needs to be modified/reset or the Context Information Message is changed, the decompression unit 216 of the UE 210 stops decompressing the RRC layer messages and transits into the Context Exchange state 410 from the Decompression state 420 to resend the updated Context Information Message.

In another embodiment, the Context Information Message additionally includes user identification information, logical channel identifier, and fixed physical layer resource information, etc.

In the process of compressing or decompressing the RRC layer messages by the base station, user identification messages of the Context Information Message, logical channel identifier and fixed physical layer resource information, etc., may be provided to the base station when the UE accesses a network or other base station/network equipment, for example, a base station controller, transmits to the base station.

In another embodiment, the compression unit of the UE and the base station may further remove RRC headers, pass a PDCP and a RLC layer, and remove MAC headers. The decompression unit of the UE and the base station may further remove RRC headers, pass a PDCP and a RLC layer, and recover MAC headers according to the received Context Information Message.

In an embodiment of the invention, with reference to FIG. 1, the machine type communications network architecture 100 may further decide whether to enable the method of compression and decompression by broadcasting a control instruction through the core network 106.

In the present invention, the signaling compression mechanism may be added in the machine type communications applications to reduce waste of resources caused by the signaling overhead in the machine type communications applications that send small size data during connection and improve resource efficiency. Moreover, the methods and devices in the present invention may further decide whether to enable the methods of compression and decompression by broadcasting a control instruction through communication network.

Certain terms are used throughout the descriptions and claims to refer to particular system components. As one skilled in the art will appreciate, consumer electronic equipment manufacturers may refer to a component by different names. This document does not intend to distinguish between components that differ in name but not function.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. A method for reducing signaling overhead configured to a user equipment (UE) connected to a base station, comprising:
   when the UE sends Radio Resource Control (RRC) layer messages to the base station, the UE compresses RRC layer messages to reduce signal overhead and sends the compressed RRC layer messages to the base station, wherein before compressing the RRC layer messages, the UE sends a Context Information Message to the base station; and
   when the UE receives the compressed RRC layer messages from the base station, the UE decompresses the compressed RRC layer messages received from the base station;
   wherein the Context Information Message further includes user identification information, logical channel identifier, and fixed physical layer resource information.

2. The method of claim 1, wherein when the UE compresses the RRC layer messages, if the Context Information Message is changed, the UE stops compressing the RRC layer messages and resends an updated Context Information Message to the base station.

3. The method of claim 1, wherein when the UE compresses the RRC layer messages, the UE removes RRC headers, and passes a Packet Data Convergence Protocol (PDCP) layer and a Radio Link Control (RLC) layer, and removes Medium Access Control (MAC) headers; and
   when the UE decompresses the compressed RRC layer messages received from the base station, the UE recovers the RRC headers, and passes a PDCP and a RLC layer, and recovers the MAC headers.

4. The method of claim 1, wherein the method is performed between a RRC layer and a PDCP layer, and the method further includes a control instruction broadcasted by a communication network to decide whether to enable the method.

5. A method for reducing signaling overhead configured to a base station connected to a user equipment (UE), comprising:
   when the base station receives Radio Resource Control (RRC) layer messages from the UE, the base station decompresses the compressed RRC layer messages; and
   when the base station sends RRC layer messages to the UE, the base station compresses RRC layer messages to reduce signal overhead and sends the compressed RRC layer messages to the UE, wherein before compressing the RRC layer messages, the base station sends a Context Information Message to the UE;

wherein the Context Information Message further includes user identification information, logical channel identifier, and fixed physical layer resource information.

6. The method of claim 5, wherein when the base station compresses the RRC layer messages, if the Context Information Message is changed, the base station stops compressing the RRC layer messages and resends an updated Context Information Message to the UE.

7. The method of claim 5, wherein when the base station compresses the RRC layer messages, the base station removes RRC headers, and passes a Packet Data Convergence Protocol (PDCP) layer and a Radio Link Control (RLC) layer, and removes Medium Access Control (MAC) headers; and when the base station decompresses the compressed RRC layer messages received from the UE, the base station recovers the RRC headers, and passes a PDCP and a RLC layer, and recovers the MAC headers.

8. The method of claim 5, wherein the method is performed between a RRC layer and a PDCP layer, and the method further includes a control instruction broadcasted by a communication network to decide whether to enable the method.

9. A user equipment (UE) for reducing signaling overhead, wherein the UE is connected to a base station through a communication network, comprising:

a Radio Resource Control (RRC) layer, a compression unit and a decompression unit, wherein when the UE sends RRC layer messages to the base station, the compression unit compresses the RRC layer messages to reduce signal overhead and sends the compressed RRC layer messages to the base station, wherein before the compression unit compresses the RRC layer messages, the UE sends a Context Information Message to the base station; and when the UE receives the compressed RRC layer messages from the base station, the decompression unit decompresses the compressed RRC layer messages received from the base station;

wherein the Context Information Message further includes user identification information, logical channel identifier, and fixed physical layer resource information.

10. The UE of claim 9, wherein when the compression unit compresses the RRC layer messages, if the Context Information Message is changed, the compression unit stops compressing the RRC layer messages and resends the updated Context Information Message.

11. The UE of claim 9, wherein when the UE compresses the RRC layer messages, the UE removes RRC headers, and passes a Packet Data Convergence Protocol (PDCP) layer and a Radio Link Control (RLC) layer, and removes Medium Access Control (MAC) headers; and when the UE decompresses the compressed RRC layer messages received from the base station, the UE recovers the RRC headers, and passes a PDCP and a RLC layer, and recovers the MAC headers.

12. The UE of claim 9, wherein the UE performs the compression and the decompression between a RRC layer and a PDCP layer, and the compression unit decides whether to enable the compression according to a control instruction broadcasted by the communication network.

13. A base station for reducing signaling overhead, wherein the base station is connected to a user equipment (UE) through a communication network, comprising:

a Radio Resource Control (RRC) layer, a compression unit and a decompression unit, wherein when the base station sends RRC layer messages to the UE, the compression unit compresses the RRC layer messages to reduce signal overhead and sends the compressed RRC layer messages to the UE, wherein before the compression unit compresses the RRC layer messages, the base station sends a Context Information Message to the UE; and when the base station receives the compressed RRC layer messages from the UE, the decompression unit decompresses the compressed RRC layer messages received from the UE;

wherein the Context Information Message further includes user identification information, logical channel identifier, and fixed physical layer resource information.

14. The base station of claim 13, wherein when the compression unit compresses the RRC layer messages, if the Context Information Message is changed, the compression unit stops compressing the RRC layer messages and resends the updated Context Information Message.

15. The base station of claim 13, wherein when the base station compresses the RRC layer messages, the base station removes RRC headers, and passes a Packet Data Convergence Protocol (PDCP) layer and a Radio Link Control (RLC) layer, and removes Medium Access Control (MAC) header; and when the base station decompresses the compressed RRC layer messages received from the UE, the base station recovers the RRC headers, and passes a PDCP and a RLC layer, and recovers the MAC headers.

16. The base station of claim 13, wherein the base station performs the compression and the decompression between a RRC layer and a PDCP layer, and the compression unit decides whether to enable the compression according to a control instruction broadcasted by the communication network.

* * * * *